United States Patent
Nelson et al.

(10) Patent No.: US 7,884,149 B2
(45) Date of Patent: Feb. 8, 2011

(54) NANOSTRUCTURED DIELECTRIC COMPOSITE MATERIALS

(75) Inventors: John Keith Nelson, Niskayuna, NY (US); Walter Zenger, Lenox, MA (US); Robert John Keefe, San Jose, CA (US); Linda Sue Schadler Feist, Niskayuna, NY (US)

(73) Assignee: Rensselaer Polytechnic Institute, Inc., Troy, NY (US)

( * ) Notice: Subject to any disclaimer, the term of this patent is extended or adjusted under 35 U.S.C. 154(b) by 0 days.

(21) Appl. No.: 12/505,037

(22) Filed: Jul. 17, 2009

(65) Prior Publication Data
US 2010/0036035 A1 Feb. 11, 2010

Related U.S. Application Data

(63) Continuation of application No. 11/044,489, filed on Jan. 27, 2005, now Pat. No. 7,579,397.

(51) Int. Cl.
C08K 3/22 (2006.01)
C08K 9/06 (2006.01)
H01B 3/44 (2006.01)

(52) U.S. Cl. .................. 524/431; 523/200; 523/212; 523/213; 523/216; 524/433; 524/447; 524/493; 528/502 F; 174/110 AR; 174/110 SR; 174/110 PM; 977/785; 264/141

(58) Field of Classification Search ................ 523/200, 523/212, 213, 216; 174/110 AR, 110 SR, 174/110 PM; 524/431, 433, 447, 493; 977/785; 528/502 F; 264/141
See application file for complete search history.

(56) References Cited

U.S. PATENT DOCUMENTS

| | | | |
|---|---|---|---|
| 4,760,296 | A | 7/1988 | Johnston et al. |
| 5,433,906 | A | 7/1995 | Dasch et al. |
| 5,462,903 | A | 10/1995 | Rousset et al. |
| 6,228,904 | B1 | 5/2001 | Yadav et al. |
| 6,344,271 | B1 | 2/2002 | Yadav et al. |
| 6,417,265 | B1 | 7/2002 | Foulger |
| 6,498,208 | B2 | 12/2002 | Border et al. |
| 6,554,609 | B2 | 4/2003 | Yadav et al. |
| 6,599,631 | B2 | 7/2003 | Kambe et al. |
| 6,607,821 | B2 | 8/2003 | Yadav et al. |
| 6,656,986 | B2 * | 12/2003 | Caronia et al. ............ 524/101 |
| 7,013,965 | B2 | 3/2006 | Zhong et al. |
| 2003/0008123 | A1 | 1/2003 | Glatkowski et al. |
| 2003/0113539 | A1 | 6/2003 | Baumann et al. |
| 2003/0161959 | A1 | 8/2003 | Kodas et al. |
| 2004/0134679 | A1 | 7/2004 | Fomperie et al. |
| 2005/0069718 | A1 | 3/2005 | Voss-Kehl et al. |
| 2007/0199729 | A1 | 8/2007 | Siegel et al. |

FOREIGN PATENT DOCUMENTS

| | | |
|---|---|---|
| CA | 2 362 157 | 9/2000 |
| DE | 40 37 972 A1 | 6/1991 |
| JP | 11-086634 | 3/1999 |
| WO | WO 02/96982 A1 | 5/2002 |
| WO | WO 2004/034409 A1 | 4/2004 |
| WO | WO 2004/038735 A1 | 5/2004 |
| WO | WO 2004/044927 A1 | 5/2004 |
| WO | WO 2005/036563 A2 | 4/2005 |

OTHER PUBLICATIONS

Nelson J.K., Fothergill J.C. Dissado L.A. and Peasgood W., "Towards an Understanding of Nanomertric Dielectrics on the Behavior of Nanometric Dielectrics", Ann Rep. Conf. on Elect. Ins: & Diel. Phen., IEEE, 2002, pp. 295-298.
Nelson J.K. Hu Y. and Thiticharoenpong J. "Electrical Properties of $TiO_2$ Nanocomposites", Ann. Rep. Conf. on Elect. Ins. & Diel. Phen., IEEE, 2003, pp. 719-722.
Nelson J.K. and Hu Y. "The Impact of Nanocomposite Formulations on Electrical Voltage Endurance", International Conf. on solid dielectrics, IEEE, Toulouse, France, Jul. 2004, pp. 832-835.
Nelson J.K. and Fothergill J.C. "Internal Charge Behaviour of Nanocomposites", Nanotechnology, vol. 15, 2004 pp. 586-595.
Fothergill J.C., Nelson J.K., and Fu M., "Dielectric Properties of Epoxy Nanocomposites Containing $TiO_2$, $Al_2O_3$, and ZnO Fillers", Ann. Rep. Conf. on Elec. Ins. & Diel. Phen., IEEE, 2004, pp. 406-409.
Nelson J.K., MacCrone R.K,. Utracki L., Reed C.W. "The Role of the Interface In Determining The Electricical Properties of Nanocomposites", Ann. Repo. Conf. on Elec. Ins. & Diel. Phen., IEEE, 2004, pp. 314-317.
Nelson J.K. and Hu Y. "Nanocomposite Dielectrics—Properties and Implications", J. Phys. D (Appl. Phys.), (accepted for publication, Dec. 2004).
Abstract of DE4037972; Dr. Thomas Baumann; High Voltage Insulator Component-Comprising Plastics Matrix Containing Finely Dispersed Sub-Micron Size Oxide Prticles; Jun. 27, 1991.

* cited by examiner

*Primary Examiner*—Fred M Teskin
(74) *Attorney, Agent, or Firm*—Curatolo Sidoti Co., LPA; Jospeh G. Curatolo; Peter R. Detorre

(57) ABSTRACT

A nanocomposite material suitable for electrical insulation includes a polymer compounded with a substantially homogeneously distributed functionalized nanoparticle filler. The nanocomposite material is produced by compounding the polymer with the functionalized nanoparticle filler by imparting a shear force to a mixture of the polymer and filler capable of preventing agglomeration of the filler whereby the filler is substantially homogeneously distributed in the nanocomposite material. The electrical insulation may be adapted for AC or DC high voltage, and may also be adapted for low or medium voltage to prevent formation of water tree structures.

14 Claims, 3 Drawing Sheets

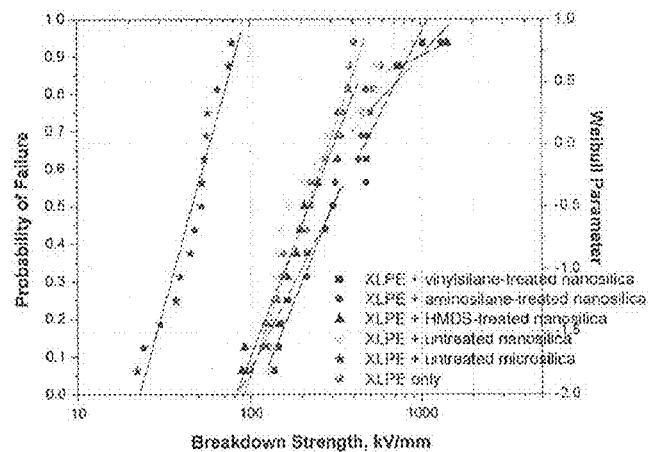
FIG. 3
FIG. 4a
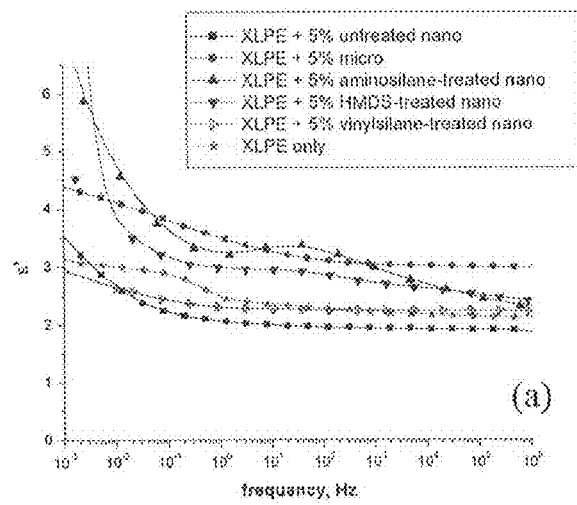
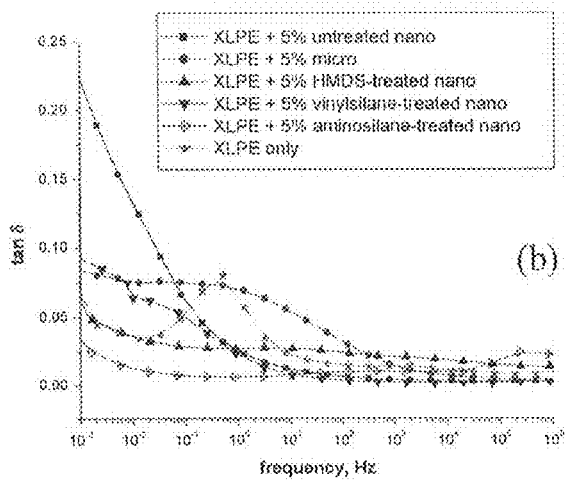
FIG. 4b

NANOSTRUCTURED DIELECTRIC COMPOSITE MATERIALS

CROSS REFERENCE TO RELATED APPLICATIONS

This application is a continuation of U.S. Ser. No. 11/044,489 filed on Jan. 27, 2005, now U.S. Pat. No. 7,579,397, which is hereby incorporated by reference.

BACKGROUND

The use of fillers in both thermoplastic and thermoset polymers has been common. The practice of filling polymers is motivated both by cost reduction and by the need to obtain altered or enhanced properties (e.g. changes in thermal expansion coefficient, corona resistance, etc). Most conventional filler materials have dimensions that are larger than 1 µm. Certain materials (e.g. inorganic oxides) are flow available in nanometric dimensions.

Nanostructured dielectric materials have demonstrated advantages over micron-filled polymer dielectrics. For example, an increase in dielectric strength and a reduction in space charge have been documented for the case of nano-$TiO_2$ filled epoxy over micron size $TiO_2$ filled epoxy composites and titania filled polyethylene composites. Improvements in dielectric properties observed for nano-filled polymers could be due to several factors: (i) the large surface area of nanoparticles which creates a large 'interaction zone' or region of altered polymer behavior, (ii) changes in the polymer morphology due to the surfaces of particles, (iii) a reduction in the internal field concentration caused by the decrease in size of the particles, and (iv) changes in the space charge distribution and/or a scattering mechanism.

It is well known that polymer properties are altered near a surface. The high surface area of nanoparticles, therefore, leads to a large volume fraction of polymer with properties different from the bulk (the interaction zone). Depending upon the strength of the interaction between polymer and particle, this region can have either a higher or lower mobility than the bulk material. It has also been postulated that the free volume in such interaction zones differs from the bulk. Because these interaction zones are likely to overlap at relatively low volume fractions in nanocomposites, a small amount of nanofiller has been shown to result in both increases and decreases in glass transition temperature.

SUMMARY

The introduction of nanometric particulates into both thermoplastic and thermosetting resins has yielded materials with enhanced electrical properties. Of particular interest are the enhanced dielectric breakdown and voltage endurance characteristics, and the mitigation of internal space charges.

Nanocomposite material is provided that is adapted for electrical insulation comprising a polymer having compounded therein a substantially homogeneously distributed functionalized dielectric nanoparticle filler.

The nanocomposite material is suitable for the formulation of electrical insulation, such as power cables, cable accessories, and the like, for high AC voltage, low AC voltage, medium AC voltage, and high DC voltage.

There is further provided a process for producing a nanocomposite material adapted for electrical insulation comprising providing a functionalized dielectric nanoparticle filler; drying the functionalized dielectric nanoparticle filler; and compounding a polymer with the dried functionalized dielectric nanoparticle filler by imparting a shear force capable of preventing agglomeration of the nanoparticle filler, whereby the nanoparticle filler is substantially homogeneously distributed in the nanocomposite material.

BRIEF DESCRIPTION OF THE DRAWINGS

FIG. 3 is a graph showing breakdown strength observed for pure cross-linked polyethylene (XLPE) and nanofilled XLPE.

FIG. 4a is a graph showing the change in permittivity as a function of frequency for unfilled XLPE, and micron filled and nanofilled XLPE.

FIG. 4b is a graph showing the change in tan δ as a function of frequency for unfilled XLPE, and micron filled and nanofilled XLPE.

DETAILED DESCRIPTION

Figure 1:
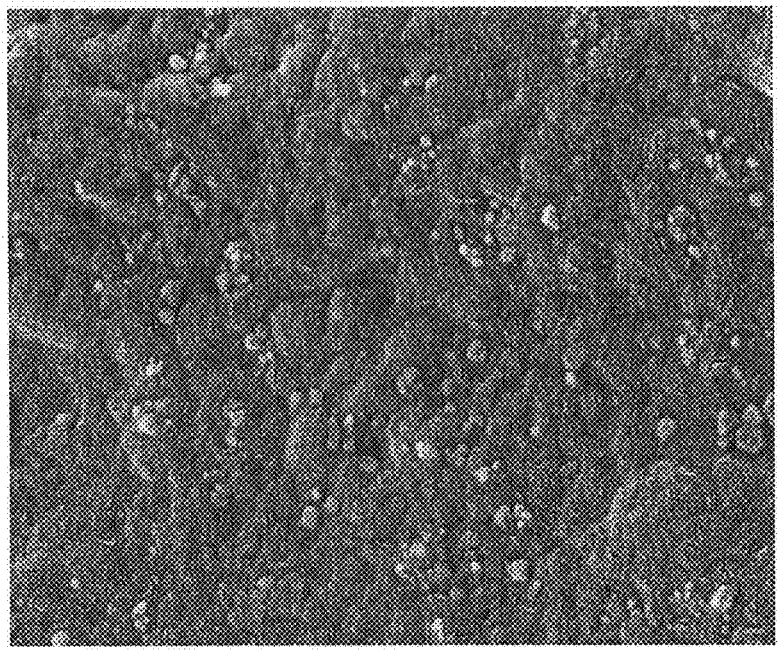
FIG. 1 is a scanning electron micrograph (SEM) of a typical homogeneous dispersion of nanofiller in polymer

Nanocomposites are provided that are suitable for the formulation of high voltage electrical insulation, such as power cables and cable accessories. However, the applications for these nanocomposites are not limited to these products, as there is a wide range of insulation applications and products of interest to the power industry. For example, the electrical insulation containing the nanocomposite material may be adapted not only for AC or DC high voltage, but may also be adapted for low or medium voltage to prevent formation of water tree structures.

While high voltage cables generally have water protection, low or medium voltage electrical insulation may not be shielded from water. The electrical insulation containing the nanocomposite material can prevent the formation of undesired structures (referred to in the industry as water trees) in the insulation polymer that develops when water contacts low or medium voltage lines.

Low voltage is typically up to about 5 kV, medium voltage is typically between about 5 and about 60 kV, and high voltage is typically 60 kV and higher. As a further example, the nanocomposite materials can be extruded or formed into tape for insulating super-conducting cables.

The nature of the nanocomposite material, or nanophase infilled polymer material, can be chosen to endow the product with unique and tailored properties (e.g. thermal or electrical conductivity, corona resistance, matched thermal expansion coefficient, etc.) without necessarily incurring the penalties commonly experienced in this process.

The nanocomposite material adapted for electrical insulation comprises a polymer having compounded therein a substantially homogeneously distributed functionalized nanoparticle filler. The introduction of nanometric particulates into both thermoplastic and thermosetting resins has yielded materials with enhanced electrical properties. Of particular interest are the enhanced dielectric breakdown and voltage endurance characteristics, and the mitigation of internal space charges which result when the particle size is reduced to approximately that of the polymer chain length.

The advantages in terms of breakdown strength, voltage endurance, reduced permittivity, and mitigation of space charge have all been demonstrated for the new formulations. Furthermore, processing parameters such as viscosity (as a function of shear rate), crystallinity, and others have been realized for the new materials, as these attributes apply to the industrial scale processing of these materials.

In certain embodiments, polyolefins and ethylene propylene rubber are useful where there is an interest in utilizing these benefits for power cables and cable accessories. In certain embodiments, the nanophase medium of choice is silicon dioxide since a material of low dielectric loss is appropriate for these applications.

Nanocomposite materials that have functionalized nanoparticles have been shown to have significantly improved properties. In this regard, functionalizing chemical agents that have been shown to be effective include aminosilane, hexamethyldisilazane (HMDS), and vinyltriethoxysilane. In particular, detailed chemical analysis has shown vinyltriethoxysilane to be particularly suited for use with polyethylene since the vinyl group will bond to the polymer while the silane couples to —OH groups at the particle interface.

With respect to the processing of these materials, substantial shear forces are needed in their compounding in order to alleviate agglomeration. Other parameters for processing conditions include particulate pre-processing, compounding temperatures, cross-linking, molding conditions and post processing.

In the present specification, "agglomerated" means that some individual particles adhere to neighboring particles, primarily by electrostatic forces.

Characterization of these materials allows informed tailoring of the nanofilled polymer materials. These include FT infra-red absorption, electron paramagnetic resonance, X-ray analysis, differential scanning calorimetry, Raman spectroscopy, thermally-stimulated currents, dielectric spectroscopy, and nuclear magnetic resonance. Engineering these materials is aided by establishing the correct conditions at the interfacial zones.

"Nanoparticle" is defined as a particulate material having an average particle or grain size between 1 and 100 nanometers. Nanoparticles are distinguishable from particles having a particle size in the micron range, that is, greater than about 1 μm. Nanoparticles of any size, that is, ranging from about 1 nm to less than about 100 nm, may be used in the nanocomposites. In certain embodiments, particle size may range from about 2 nm to about 80 nm, optionally from about 5 nm to about 50 nm, and in other embodiments, from about 5 to about 30 nm.

Particle size distribution of the nanoparticles is typically narrow. A narrow particle size distribution is defined as one in which greater than about 90% of the particles have a particle size in the range of about 0.2 to about 2 times the mean particle size. In certain embodiments, greater than 95% of the particles have a particle size in this range, optionally greater than 99%. Another way to define a particle size distribution is in terms of the mean particle size and the width of the distribution; this method is used in the nanoparticle industry. The relationship between the width of the distribution curve at one half of the maximum value (full width-half max or FWHM) and mean particle size is used as a measure of broadness or narrowness of the distribution. For example, a distribution having a FWHM value that is greater than the mean particle size is considered relatively broad. Specifically, a narrow particle size distribution is defined in terms of FWHM as a distribution in which the FWHM of the distribution curve is equal to the difference between the mean particle size plus 40% of the mean and the mean minus 40% of the mean. (This may be simplified to two times 40% of the mean, or 80% of the mean. Using this simplified formula, the FWHM is less than or equal to 80% of the mean.) In certain embodiments the FWHM is less than or equal to the difference between the mean plus 30% and the mean minus 30% (60% of the mean.). In other embodiments, the FWHM is less than or equal to the difference between the mean plus 20% and the mean minus 20% (40% of the mean).

Nanoparticles useful in the nanocomposites may be equiaxed, such that their shape is quasi-spherical. The long axis of a particle is defined as the longest axis through a particle, and the short axis means the shortest axis through a particle. In certain embodiments, the long axis of the nanoparticles for use in the nanocomposites adapted for electrical insulation is approximately equal to the short axis, resulting in a particle shape that is quasi-spherical. In these embodiments, for at least about 90% of the nanoparticles, the ratio of the length of the short axis to that of the long axis is at least about 0.1, optionally about 0.4, and further optionally about 0.8.

Non-spherical nanoparticles may also be used in the nanocomposites adapted for electrical insulation. In this case, particle size is defined as the size of the smallest dimension of the particle. For example, nanotubes having an average particle diameter of about 1 to less than 100 nm may be used, and particle size of such particles is the particle diameter, about 1 to less than 100 nm. Other non-spherical nanoparticles that may be used in nanocomposites adapted for electrical insulation include carbon or ceramic nano-fiber whiskers.

A nanocomposite material adapted for use in electrical insulation comprises a polymer having compounded therein a substantially homogeneously distributed, functionalized, dielectric nanoparticle filler. The nanoparticle filler may be at least one of a metal boride, a metal carbide, a metal carbonate, a metal hydroxide, a metal nitride, a metal oxide, a mixed metal oxide, a metal silicate, a metal titanate, a silica, a carbon nanotube, or carbon or ceramic nano-fiber whiskers.

In certain embodiments, the nanoparticle filler is at least one of alumina, aluminum hydroxide, aluminum nitride, barium oxide, barium strontium titanate, barium titanate, calcium borate, calcium carbonate, calcium oxide, glass fibers, glass particles, kaolin clay, magnesium aluminum silicate, magnesium calcium carbonate, magnesium calcium silicate, magnesium hydroxide, magnesium oxide, silica, silicon carbide, sodium borate, strontium oxide, strontium titanate, talc, titania, zinc oxide, zirconia, zirconium silicate, or mixtures thereof. Representative silicas include, without limitation, quartz and amorphous silica, such as fumed silica or precipitated silica.

By being functionalized, it is meant that the surface of the nanoparticle filler has been treated to result in the presence of a functional moiety, such as at least one of an organosilane, an organotitanate or an organozirconate, prior to preparing the nanocomposite. In certain embodiments, the moiety comprises an organic group selected from alkyl, alkylamino, alkoxy, amino, carboxy and vinyl, or combinations thereof. The nanoparticle filler may be treated, by known methods, with a compound, such as a coupling agent, such that the nanoparticle filler surface moiety is a reaction residue of the coupling agent, in certain exemplified embodiments, of at least one of aminosilane, hexamethyldisilazane, or vinyltriethoxysilane.

The coupling agent may be applied from a solution or the gas phase to the filler particles. The coupling agent acts as interface between the polymer and the nanoparticle filler to form a chemical bridge between the two. Representative examples include organotrialkoxysilanes, titanates, and zirconates. Silane coupling agents may comprise silanes of the formula $Si_nH_{2n+2}$ and other monomeric silicon compounds having the ability to bond inorganic materials, such as nanoparticle fillers, to organic resins. The adhesion mechanism is due to two groups in the silane structure, a hydrolyzable group, usually an alkoxy group and an organofunctional group. The $Si(OR_3)$ portion reacts with the inorganic reinforcement, while the organofunctional (vinyl-, amino-, etc.) group reacts with the resin. The coupling agent may be applied to the inorganic materials as a pre-treatment. Titanate and zirconate couplers are a family of alkoxy titanates and zirconates that typically have one to three pendant organic functional groups. The titanate couplers may also act as plasticizers to enable higher loadings and/or to achieve better flow.

Organosilane compounds useful for modifying the surface of nanoparticles may have the formula $R_nSiR_{(4-n)}$ and contain n hydrolyzable R groups, where n is 1-3, which may be alkoxy groups; R may be alkyl, alkylamino, alkoxy, amino, aryl, cyano, carboxy, hydroxy, epoxy, mercapto, or vinyl. In certain embodiments the organic groups are methyl, decyl, octyl, aminopropyl, and/or acetoxy. For hydrophobic polymers, such as polyethylene, for example, non-polar alkyl groups having at least ten carbon atoms, may yield improved properties. For hydrophilic polymers, such as epoxy resins, R may preferably contain polar functional groups such as amino or epoxy groups. Examples of hydrophobic silanes that may be used include n-decyltriethoxysilane, dodecyltriethoxysilane, hexadecyltrimethoxy silane, or n-octadecyltrimethoxysilane. Examples of silanes containing organofunctional groups include n-(2-aminoethyl)-3-aminopropyltriethoxysilane, n-(2-aminoethyl)-3-aminopropyltrimethoxy silane, 3-aminopropyltrimethoxysilane, 3-aminopropyltriethoxysilane, methacryloxypropyltrimethoxysilane, methacryloxymethyltriethoxysilane, acetoxyethyltrimethoxysilane, (3-acryl-oxypropyl)trimethoxysilane, 5,6-epoxyhexyltriethoxysilane, (3-glycidoxypropyl)triethoxy silane, (3-glycidoxypropyl)trimethoxysilane, 3-mercaptopropyltrimethoxysilane, 3-mercaptopropyltriethoxysilane, 2-cyanoethyltrimethoxysilane, vinyltrimethoxysilane, vinyltriethoxysilane, allyltriethoxysilane, and n-(3-acryloxy-2-hydroxypropyl)-3-aminopropyltriethoxysilane.

The titanate and zirconate couplers may include tetraalkoxy titanates [$Ti(OR)_4$] and tetraalkoxy zirconates [$Zr(OR)_4$], where R is alkyl, such as methyl, ethyl, propyl, isopropyl, n-butyl, or t-butyl, and organic titanates [$R_nTiR'_{(4-n)}$] and organic zirconates [$R_nZrR'_{(4-n)}$]. The most common alkoxy groups are methoxy, and ethoxy. An exemplary titanate coupler is titanium methacrylate triisopropoxide.

Further, the surface of a nanoparticle utilized in the nanocomposites is typically chemically clean, that is, uncontaminated by residues from chemicals used in the synthetic process. Methods that produce nanoparticles from a gas phase, such as a gas condensation process, such as that described in U.S. Pat. Nos. 5,128,081 and 5,320,800, the contents of which are incorporated herein by reference, typically yield a clean surface. Nanoparticles made by wet chemical methods are often contaminated by residues from chemicals used in the process; these particles may be subject to a post-production clean-up process to yield a chemically clean surface. For example, many processes for the production of titanium dioxide particles involve the oxidation of $TiCl_4$ to $TiO_2$. The surface of particles produced by this process contains residual chloride ions from the $TiCl_4$. These residues may be removed by chemical cleaning processes, if desired. Nanoparticles produced by a gas condensation process are not contaminated by process residues, because no solvents, reagents or intermediates are used. Therefore, zinc oxide or titanium dioxide nanoparticles for use in the nanocomposites may be prepared by a gas condensation process.

Alkyl is intended to include linear, branched, or cyclic hydrocarbon structures and combinations thereof, including lower alkyl and higher alkyl. Representative alkyl groups are those of $C_{20}$ or below. Lower alkyl refers to alkyl groups of from 1 to 6 carbon atoms, and includes methyl, ethyl, n-propyl, isopropyl, and n-, s- and t-butyl. Higher alkyl refers to alkyl groups having seven or more carbon atoms, such as 7-20 carbon atoms, and includes n-, x- and t-heptyl, octyl, and dodecyl.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbons.

The nanoparticle filler suitable for electrical insulating applications (i.e., "insulating effective amount") may comprise up to about 20% by volume of the nanocomposite material, optionally up to about 10% by volume of the nanocomposite material, and further optionally up to about 5% by volume of the nanocomposite material, for metal oxide particles, this is typically about 5% by weight.

The polymer used in the nanocomposite material may comprise at least one of a rubber, a thermoplastic polymer, a thermosetting polymer or a thermoplastic elastomer. In certain embodiments, the polymer may comprise a polyolefin rubber, a thermoplastic polyolefin elastomer/plastomer, a silicone rubber, a crystalline thermoplastic polymer, or a semicrystalline thermoplastic polymer. Examples of such polymers include, but are not limited to ethylene propylene diene monomer (EPDM) rubber, ethylene propylene rubber (EPR), polyethylene, or co-polymers of ethylene with at least one $C_3$ to $C_{20}$ alpha-olefin or optionally at least one $C_3$ to $C_{20}$ polyene. A variety of diluents and additives which are well known to those skilled in the art may be mixed with the polymer resins including water, oils, antioxidants, coupling agents, cross-linking agents, diluents, pigments and dispersants.

In specific embodiments of the nanocomposite material, the polymer may comprise at least one of polyethylene, EPR or EPDM, and the nanoparticle filler comprises silica having a surface moiety of a reaction residue of at least one of aminosilane, hexamethyldisilazane, or vinyltriethoxysilane. For example, discussed below is extensive testing of the nanocomposite material in which the polymer comprises cross-linked polyethylene, and the nanoparticle filler comprises silica having a surface moiety of a reaction residue of vinyltriethoxysilane, as well as aminosilane, and hexamethyldisilazane.

Other polymers that may be used as the polymer include epoxy, polycarbonate, silicone, polyester, polyether, polyolefin, synthetic rubber, polyurethane, nylon, polyvinylaromatic, acrylic, polyamide, polyimide, phenolic, polyvinylhalide, polyphenylene oxide, and polyketone resins, homopolymers and copolymers and blends thereof. Copolymers may include both random and block copolymers.

Polyolefin resins include polybutylene, polypropylene and polyethylene, such as low density polyethylene (LDPE), medium density polyethylene (MDPE), high density polyethylene (HDPE), and ethylene copolymers; polyvinylhalide resins include polyvinyl chloride polymers and copolymers and polyvinylidene chloride polymers and copolymers, and fluoropolymers; polyvinylaromatic resins include polystyrene polymers and copolymers and poly α-methylstyrene polymers and copolymers; acrylate resins include polymers and copolymers of acrylate and methacrylate esters; polyamide resins include nylon 6, nylon 11, and nylon 12, as well as polyamide copolymers and blends thereof; polyester resins include polyalkylene terephthalates, such as polyethylene terephthalate and polybutylene terephthalate, as well as polyester copolymers; synthetic rubbers include styrene-butadiene and acrylonitrile-butadiene-styrene copolymers; and, polyketones include polyetherketones and polyetheretherketones.

Processing Nanocomposites

The nanocomposite material suitable for electrical insulation may be produced by providing the appropriate functionalized dielectric nanoparticle filler, drying the functionalized dielectric nanoparticle filler, and thereafter compounding a polymer with the dried functionalized dielectric nanoparticle filler. Compounding is carried out by imparting a shear force to the mixture of the polymer and nanoparticle filler that is capable of preventing agglomeration of the nanoparticle filler. The high shear mixing is conducted such that the nanoparticle filler is substantially homogeneously distributed in the nanocomposite material.

Providing silica nanoparticles in polyethylene as an example, but not for reasons of limitation, a suitable processing method to make and use the nanocomposite material for electrical insulation articles can be summarized by the following steps:

1. Drying of the nanoparticles.
2. Mixing the silica nanoparticles with low density polyethylene (LDPE) pellets at a shear rate capable of preventing agglomeration of the silica nanoparticles filler in the LDPE melt to form a uniform dispersion.
3. Pelletizing the compounded nanocomposite material.
4. Contacting the nanocomposite pellets or mixing the nanocomposite melt with a cross-linking agent (for example, Dicumyl Peroxide or DCP).
5. Forming the insulation article such as through extrusion or pressing.
6. Crosslinking the article to form nano-silica filled cross-linked polyethylene (XLPE).
7. Post-cure (degassing) treatment of the insulation article.

Molecular water is attached to the surface of nano-particles through hydrogen bonding, such as to hydroxyl groups on the oxide surfaces of the nano-particles, among other mechanisms. Drying may be carried out to remove this surface adsorbed water, as well as any fugitive chemical species remaining as a result of the nanoparticle surface treatment.

Figure 2:
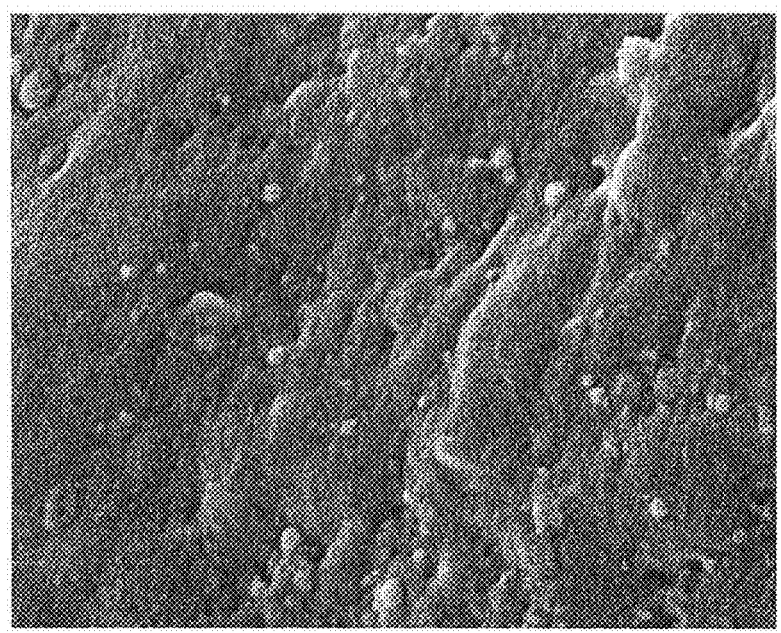
FIG. 2 is a scanning electron micrograph (SEM) of an inhomogeneous dispersion of agglomerated nanofiller in polymer.

The importance of use of dried nanoparticle filler is demonstrated by the SEM micrographs of FIGS. 1 and 2. FIG. 1 shows a typical homogeneous dispersion of nanoparticle filler in polymer, which nanoparticle filler was dried before being introduced into the polymer. FIG. 2 shows an inhomogeneous dispersion of agglomerated nanoparticle filler in polymer, which nanoparticle filler was not dried before being introduced into the polymer.

The dried, functionalized nanoparticle filler may be mixed with the polymer in a continuous or batch process at a temperature above the melt temperature of the polymer. The nanoparticle filler may be added with the pelletized polymer resin, and further additions may be made, such as in a batch process, after melt, to provide a higher loading of material. The mixer, or extruder used to carry out the dispersion process should be able to generate sufficiently high stresses or shear to facilitate homogeneous dispersion of the nanoparticles without exceeding the polymer degradation temperature. Proper dispersion can be verified in a quality control step using field emission scanning electron microscopy. Melt viscosity of the nanoparticle filled polymer may also be measured in a quality control step using a capillary rheometer in order to evaluate processability. Torque and temperature may be measured during mixing to control the process parameters. Temperature must be high enough to melt the polymer, but must not lower viscosity to the point that adequate shear cannot be maintained.

Following mixing, the compounded nanocomposite material may be pelletized by known methods, followed by contacting the pellets with the cross-linking agent, such as by spraying, dipping, soaking and the like. The cross-linker coated nanocomposite pellets may then be melted at a mild temperature and introduced into a heated vulcanization chamber or tube, according to known methods, such as with heating under nitrogen or steam at an elevated pressure, to decompose the cross-linker and cause cross-linking of the polymer. The insulation article, such as a cable or tape is then formed, and undergoes a cooling step, such as water cooling, also under pressure, to prevent byproducts from expanding voids in the material. The insulation article may then be coiled on a reel, and degassed at mild heating conditions to evolve the gaseous byproducts.

EXAMPLES

The base polyethylene used in the examples was a premium material from Borealis (Rockport, N.J.) used in the manufacture of high-voltage (HV) extruded cross-linked underground cables. It is a high purity, filtered resin containing antioxidants.

The fumed silica used in the examples, of both micro- and nanometric size, was sourced from Aerosil (Degussa Corp.) (Parsippany, N.J.). Surface modified nanosilica (aminosilane and hexamethyldisilazane (HMDS)) was also obtained from Aerosil. Some untreated nanosilica (AR 200) was surface-modified with triethoxyvilylsilane in the vapor phase by Polymer Valley Chemical, (Akron Ohio). FTIR characterization of the particles suggests that the silane groups were covalently attached to the nanoparticles. In addition, for the vinylsilane treated nanoparticles, the vinyl group reacted with the XLPE during processing, resulting in a covalent linkage between the XLPE and the vinylsilane treated nanoparticles.

Dynamic vacuum drying of all the micro- and nano-particles was carried out at 195° C. (except the vinylsilane-treated particulates which were dried at 160° C.) for 24 hours immediately prior to compounding. This drying temperature was determined from thermogravimetric analysis (TGA). The composite was mixed with a Haake® melt mixer at and protocol to assure a uniform dispersion of the particles.

A sample with multiple recesses was used for breakdown strength measurements and laminar samples were used for dielectric spectroscopy. All samples were created by hot pressing at a temperature of about 165° C. The pressure applied to the samples was initially 7 Mpa, which was increased to 25 Mpa after 25 minutes. After slow cooling under pressure, the samples were post-cured under vacuum at 70° C. for 72 hours to drive out the crosslinking by products, and were metallized with about 150 Å of sputtered gold.

The crystallinity and melting temperature of the processed samples were measured using Differential Scanning Calorimetry (DSC) at a heating rate of 10° C. per minute. Heating/cooling cycles were repeated twice for each sample and the second peak was considered for calculation. The weight of the sample for each experiment was approximately 5 mg. A set of four specimens was used for each type of sample, and the right tangential method was used to determine the crystallinity of the samples. Table 1 summarizes the DSC tests.

TABLE 1

| Sample Type | Degree of Crystallinity (%) | Melting Point (° C.) |
|---|---|---|
| XLPE Only | 44.6 ± 0.1 | 103.2 ± 1.4 |
| 5% Untreated nanosilica + XLPE | 43.8 ± 1.0 | 109.0 ± 0.5 |
| 5% Aminosilane treated nanosilica + XLPE | 45.8 ± 1.1 | 109.0 ± 0.6 |
| 5% HMDS treated nanosilica + XLPE | 46.2 ± 1.4 | 109.0 ± 1.1 |
| 5% Vinylsilane treated nanosilica + XLPE | 60.1 ± 1.5 | 108.1 ± 1.1 |

Breakdown strength measurements were conducted for nanocomposites and compared to the base resin. A conventional Weibull distribution was used to analyze the breakdown data for samples ranging in thickness from 0.15 mm to 0.015 mm. The cumulative probability P of the electrical failure is represented by formula (1):

$$P = 1 - \exp\left[-\left(\frac{E}{E_0}\right)^\beta\right] \quad (1)$$

where $\beta$ is a shape parameter and $E_0$ is a scale parameter that represents the breakdown strength at the cumulative failure probability of 63.2%. Breakdown tests were conducted at four different temperatures (25° C., 60° C., 70° C., and 80° C.) to study the effect of temperature on the breakdown phenomenon.

Dielectric spectroscopic measurements were conducted for base polymer, micro-filled, nano-filled, and surface modified nano-filled composites at various temperatures using a Novocontrol Alpha Analyser (type K) in combination with a Novocontrol active BDS-1200 sample cell. Laminar samples, each approximately 0.5 mm thick with gold sputtered electrodes on both sides matching an electrode diameter of 2.2 centimeter were used for the measurements.

Results

One of the major factors controlling the properties of nanocomposites is dispersion of the nanofillers. FIG. 1 shows an SEM micrograph of a typical homogeneous dispersion observed in the nanocomposites tested. In comparison, FIG. 2 shows an SEM micrograph of nanofiller heterogeneously dispersed in polymer, revealing agglomerates of nanofiller in the polymer. FIG. 3 shows the breakdown strength observed for the pure XLPE and the nanofilled XLPE. There is an increase in breakdown strength over the base resin for all the nanofilled composites, but the largest increase was observed for the vinylsilane treated silica/XLPE composite. In addition, the vinylsilane treated silica/XLPE samples maintained their breakdown strength at elevated temperature, decreasing by a factor of 2 at 80° C., as shown in Table 2. For all other samples, the strength decreased by a factor of about three as the temperature was increased to 80° C.

TABLE 2

| Materials | Temperature | | | |
|---|---|---|---|---|
| | 25° C. | 60° C. | 70° C. | 80° C. |
| XLPE | 269.30 | 183.59 | 129.20 | 79.37 |
| XLPE + Untreated nanosilica | 314.60 | 260.90 | 213.48 | 83.60 |
| XLPE + Aminosilane-treated nanosilica | 400.10 | 266.20 | 263.17 | 134.55 |
| XLPE + HMDS-treated nanosilica | 336.60 | 225.20 | 208.00 | 128.60 |
| XLPE + Vinylsilane-treated nanosilica | 446.63 | 422.23 | 344.18 | 220.60 |

FIGS. 4(*a*) and 4(*b*) show the change in permittivity (∈') and tan δ as a function of frequency for the unfilled XLPE as well as the micron filled and nanofilled XLPE. FIG. 4(*a*) shows that the high-frequency permittivity of the untreated nanosilica composite is significantly less than the micron filled composite and somewhat less than the base resin. Surface treatment increases the permittivity, in theory due to the polarity of the surface modifier. The tan δ behavior shows reduced loss for some of the surface modified nanosilica composites and significantly less loss for all the nanosilica composites at operating frequency compared to the micron filled composite.

Although not intending to be bound by theory, the effect of nanoparticles on breakdown strength and permittivity could be due to the size of the particles which creates both a large surface area of nanoparticles (large interfacial region) and a reduction in the internal field concentration, changes in the polymer morphology, and changes in the space charge distribution and/or a scattering mechanism. The hypothesis is that the small size of the particles resulting in a lower internal field concentration coupled with the impact of the large surface area dominates the changes in breakdown strength and dielectric response. This is supported by the crystallinity data. While it is well known that crystallinity affects the breakdown properties of XLPE, it is not the dominant factor here.

Table 1 shows the degree of crystallinity in the samples prepared above. There is no significant difference in crystallinity except for the sample with silica nanofiller modified with vinylsilane, which resulted in a 50% increase in crystallinity. While the vinylsilane-treated nanoparticles did result in the composites with the highest breakdown strength, the largest increase in breakdown strength was for nanoparticles over micron scale particles where no significant change in crystallinity occurred. However, there could be change in local crystallinity due to adsorption of polymer chains to the particle, and for nanoparticles, the probability of the same chain adsorbed onto the particle more than once is low as the size of the particle is comparable to the chain confirmation length. This helps in reducing the internal defects in nanocomposites, which acts as the precursor for the breakdown. In vinylsilane-treated nanocomposites the chains are covalently attached to the nanoparticles, in probability reducing these internal defects even further.

Several factors point to the dominance of the interface. First, the permittivity of the nanoparticle/XLPE composites is lower than the base resin. This implies that the interface is creating a reduction in free volume that reduces the atomic and electronic polarization (as evidenced by the $T_g$ changes in Table 1). This reduction in mobility might also occur in micron scale particle composites, but the volume of interface is too small to have an effect. In addition, there is significant interfacial polarization in the micron particle composites resulting in dispersion at about 70 Hz. This is mitigated in the nanoparticle composites, particularly for nanoparticles treated with aminosilane or HMDS.

The breakdown strength is also significantly impacted by the interface. An extensive electron paramagnetic resonance data taken on this system suggests that there is a higher concentration of oxygen radicals on the surface of nanoparticles which increases further in the nanocomposites. This shows the ability of the nanoparticles to hold surface charges without quantum tunneling. This high charge on the nanoparticle surface could create an envelope of positive counter ions outside it, making an electrical double layer. Even at low volume fraction of particles, these regions could overlap creating a local conductive pathway reducing the buildup of space charge. Surface modification of nanoparticles effectively increases the screening length by altering the charge distribution and thereby improving the breakdown strength.

The vinylsilane-treated nanoparticles should lead to a higher crosslink density in the nanocomposites. This would explain why the breakdown drops less at the glass transition temperature, as the crosslinks inhibit polymer mobility. Further, the large interfacial area of nanocomposites provides superior breakdown strength and permittivity over microcomposites.

Figure 5:
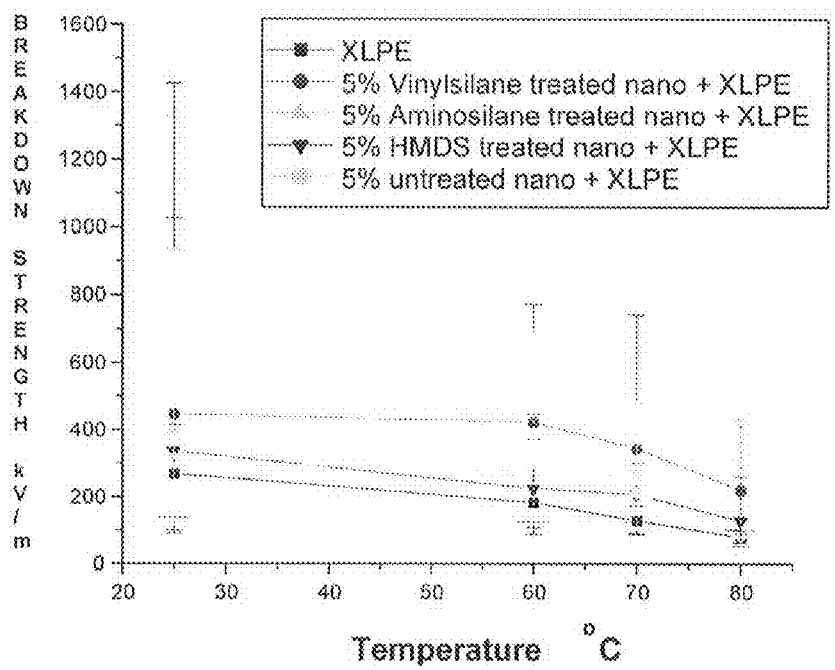
FIG. 5 is a graph showing a comparison of electrical breakdown strength of XLPE-based nanocomposites having different surface functionalization.
Figure 6:
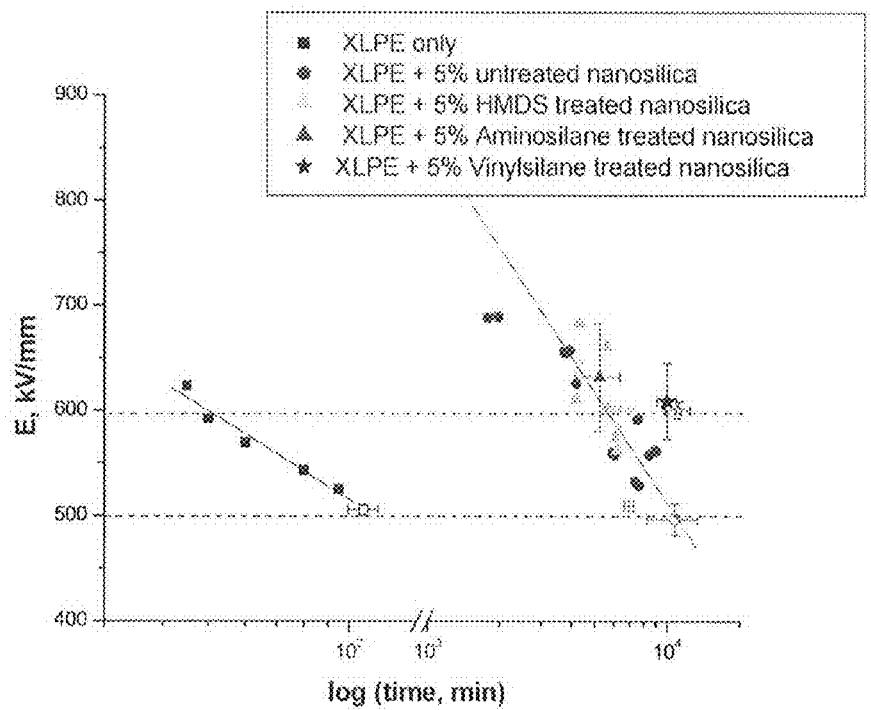
FIG. 6 is a graph showing voltage endurance characteristics for polyethylene-based nanocomposites.

FIG. 5 shows a comparison of electrical breakdown strength of XLPE-based nanocomposites with different surface functionalization measured at different temperatures. The vinylsilane-treated silica nanoparticles exhibited the highest breakdown strength. FIG. 6 shows voltage endurance characteristics for polyethylene-based composites as a function of time. Vinylsilane modified nanosilica particles at 5% loading provided enhanced voltage endurance characteristics.

The above results demonstrate the suitability for electrical insulation and the improvement in dielectric properties obtained using a nanocomposite material comprising a polymer having compounded therein a substantially homogeneously distributed functionalized dielectric nanoparticle filler.

While the present invention has been explained in relation to certain embodiments, it is to be understood that various modifications thereof will become apparent to those skilled in the art upon reading the specification. It should be understood that the embodiments described above may be practiced in the alternative, or in combination, as appropriate. Therefore, it is to be understood that the present invention is not limited to the specific embodiments described above, but includes variations, modifications defined by the following claims and equivalent embodiments. All such modifications and variations are intended to be included within the scope of the invention as defined in the appended claims.

The invention claimed is:

1. A process for producing a nanocomposite material suitable for a power cable electrical insulation article comprising:
    providing a functionalized dielectric nanoparticle filler wherein the nanoparticle filler is at least one of silica, titania, kaolin clay, or magnesium oxide;
    drying the functionalized dielectric nanoparticle filler;
    compounding a polymer with the dried functionalized dielectric nanoparticle filler by imparting a shear force capable of preventing agglomeration of the nanoparticle filler, whereby the nanoparticle filler is substantially homogeneously distributed in the nanocomposite material;
    pelletizing the compounded nanocomposite material;
    melting the pelletized nanocomposite material; and,
    forming the insulation article.

2. The process of claim 1, further comprising contacting the pelletized nanocomposite material with a cross-linking agent, wherein the cross-linking agent coated pelletized material is capable of melting and forming the insulation article.

3. The process of claim 1, further comprising mixing a cross-linking agent in a melt of the pelletized nanocomposite material.

4. The process of claim 1, wherein the surface of the nanoparticle filler has an organosilane functional moiety; wherein the moiety optionally comprises at least one of alkyl, alkylamino, alkoxy, amino, aryl, cyano, carboxy, hydroxy, epoxy, mercapto, vinyl, or combinations thereof.

5. The process of claim 4, wherein the nanoparticle filler surface moiety is a reaction residue of at least one of aminosilane, hexamethyldisilazane, vinyltrimethoxysilane, or vinyltriethoxysilane.

6. The process of claim 1, wherein the polymer comprises at least one of polyethylene, ethylene propylene rubber, ethylene propylene diene monomer rubber, a co-polymer of ethylene with at least one $C_3$ to $C_{20}$ alpha-olefin, or a co-polymer of ethylene with at least one $C_3$ to $C_{20}$ polyene.

7. The process of claim 6, wherein the polymer comprises polyethylene.

8. The process of claim 1, wherein the nanoparticle filler has a particle size ranging from 2 to 80 nm.

9. The process of claim 1, wherein the nanoparticle filler comprises up to about 20% by volume of the nanocomposite material.

10. The process of claim 1, wherein the nanoparticle filler comprises up to about 10% by volume of the nanocomposite material.

11. The process of claim 1, wherein the nanoparticle filler is silica, optionally, wherein the silica comprises at least one of quartz, amorphous silica, fumed silica, or precipitated silica.

12. A method to make a nanocomposite material for an electrical insulation article comprising:
    drying a functionalized dielectric silica nanoparticle filler;
    compounding by mixing the silica nanoparticle filler with low density polyethylene pellets at a shear rate capable of preventing agglomeration of the silica nanoparticle filler to form a substantially homogeneous, uniform nanocomposite material dispersion;
    pelletizing the compounded nanocomposite material;
    contacting the nanocomposite pellets with a cross-linking agent or mixing a cross-linking agent in a melt of the pelletized nanocomposite material;
    forming the insulation article; and,
    cross-linking the insulation article to form silica nanoparticle filled cross-linked polyethylene.

13. The method of claim 12, wherein the functionalized dielectric silica nanoparticle filler comprises vinylsilane treated silica nanoparticles, further comprising forming a covalent linkage between the cross-linked polyethylene and the vinylsilane treated silica nanoparticles.

14. The method of claim 13, wherein the vinylsilane treated silica nanoparticles comprise at least 5% by volume of the nanocomposite material.

* * * * *